US008478837B2

(12) United States Patent
Ollis et al.

(10) Patent No.: US 8,478,837 B2
(45) Date of Patent: Jul. 2, 2013

(54) OFFLINE GLOBAL ADDRESS LIST

(75) Inventors: Joseph Kirk Ollis, Kirkland, WA (US); David W. Flynt, Lake Forest Park, WA (US); Jon Xu, Bellevue, WA (US); Marc W. Todd, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1706 days.

(21) Appl. No.: 10/767,474

(22) Filed: Jan. 28, 2004

(65) Prior Publication Data

US 2005/0164651 A1    Jul. 28, 2005

(51) Int. Cl.
 G06F 15/16 (2006.01)
(52) U.S. Cl.
 USPC ............................ 709/217; 709/219; 709/221
(58) Field of Classification Search
 USPC .......................................... 709/217, 219, 221
 See application file for complete search history.

(56) References Cited

U.S. PATENT DOCUMENTS

| | | | | |
|---|---|---|---|---|
| 5,966,714 A * | 10/1999 | Huang et al. | | 707/201 |
| 6,243,705 B1 * | 6/2001 | Kucala | | 707/10 |
| 6,269,393 B1 * | 7/2001 | Yost et al. | | 709/201 |
| 6,377,161 B1 * | 4/2002 | Gromelski et al. | | 340/7.45 |
| 6,633,311 B1 | 10/2003 | Douvikas et al. | | 345/731 |
| 6,636,897 B1 * | 10/2003 | Sherman et al. | | 709/248 |
| 6,691,158 B1 | 2/2004 | Douvikas et al. | | 709/219 |
| 6,760,728 B1 * | 7/2004 | Osborn | | 707/10 |
| 6,845,370 B2 * | 1/2005 | Burkey et al. | | 707/3 |
| 6,956,942 B2 * | 10/2005 | McKinzie et al. | | 379/355.04 |
| 7,092,994 B2 * | 8/2006 | Nishio et al. | | 709/206 |
| 7,334,020 B2 * | 2/2008 | Caughey | | 709/206 |
| 7,539,699 B2 * | 5/2009 | Kobashikawa et al. | | 707/102 |
| 2001/0034244 A1 * | 10/2001 | Calder et al. | | 455/556 |
| 2002/0049610 A1 * | 4/2002 | Gropper | | 705/1 |
| 2002/0049751 A1 * | 4/2002 | Chen et al. | | 707/3 |
| 2003/0084162 A1 | 5/2003 | Johnson et al. | | 709/227 |
| 2003/0093483 A1 * | 5/2003 | Allen et al. | | 709/207 |
| 2003/0171942 A1 * | 9/2003 | Gaito | | 705/1 |
| 2004/0135816 A1 * | 7/2004 | Schwartz et al. | | 345/811 |
| 2004/0186848 A1 * | 9/2004 | Kobashikawa et al. | | 707/102 |
| 2004/0199581 A1 * | 10/2004 | Kucharewski et al. | | 709/204 |
| 2004/0266414 A1 * | 12/2004 | Likwornik | | 455/415 |
| 2005/0198144 A1 * | 9/2005 | Kraenzel et al. | | 709/206 |

FOREIGN PATENT DOCUMENTS

| | | |
|---|---|---|
| EP | 1 035 489 A2 | 9/2000 |
| JP | 10-49466 | 2/1998 |
| JP | 11-136280 | 5/1999 |
| JP | 2002-123468 | 4/2002 |
| KR | 10-2002-0019852 | 3/2002 |
| WO | WO 01/50680 A2 | 7/2001 |

OTHER PUBLICATIONS

"Computing Tip of the Week", Internet Article from UW Colleges Information Technology Department, Mar. 14, 2003, 3 pages. http://www.uwc.edu/training/ctow/CTOW3_14_03.htm, last accessed Aug. 3, 2005.

(Continued)

*Primary Examiner* — Thomas Dailey
(74) *Attorney, Agent, or Firm* — Merchant & Gould

(57) ABSTRACT

The present invention provides a method and system for providing a mobile device with a selected subset of global address list (GAL) contacts. The offline GAL contacts stored on the device are in sync with the master corporate GAL. The GAL contacts are automatically selected based on the user's emails or meetings and are not duplicates of the contacts within the user's personal contact list. The GAL contacts are browsed and searched seamlessly with the user's other contacts.

18 Claims, 7 Drawing Sheets

OTHER PUBLICATIONS

"Review—Beyond Contacts from Dataviz", Internet Article, May 16, 2003, 10 pages. http://www.bargainpda.com/default.asp?newsID=1371&showComments=true>, last accessed Jul. 26, 2005.

S. Whittaker et al., "Contact Management: Identifying Contacts to Support Long-Term Communication", Computer Supported Cooperative Work, Proceedings of the 2002 ACM Conference on Computer Supported Cooperative Work, pp. 216-225, Nov. 16-20, 2002.

J. Tang et al., "ConNexus to Awarenex: Extending awareness to mobile users", CHI 2001, vol. 3, No. 1, pp. 221-228, Mar. 31-Apr. 5, 2001.

J. Trevor et al., "Contextual Contact Retrieval", International Conference on Intelligent User Interfaces, Proceedings of the 9th International Conference on Intelligent User Interface, pp. 337-339, Jan. 13-16, 2004.

Office Action mailed Jul. 20, 2006, in EP Application No. 05100420.8.

Office Action mailed Jul. 2, 2010, in JP Application No. 2005-021784 (w/translation).

Office Action mailed Jul. 6, 2010, in CN Application No. 200510007050.3 (w/translation).

Office Action mailed Aug. 19, 2011, in KR Application No. 10-2005-0007932, w/translation.

Office Action mailed Oct. 14, 2011, in CN Application No. 200510007050.3 (w/translation).

"Introduction to Microsoft Outlook 2003 Mail"; Sep. 19, 2003; source: http://www.officetutorials.com/; 39 pgs.

Office Action mailed Mar. 2, 2012, in CN Application No. 200510007050.3 (w/translation).

Office Action mailed Mar. 23, 2012, in KR Application No. 10-2005-0007932 (w/translation).

* cited by examiner

OFFLINE GLOBAL ADDRESS LIST

BACKGROUND OF THE INVENTION

A user's desktop computer and personal information managers, such as in PDAs and cell phones, typically maintain lists of contacts. These contact lists store information about each contact including items, such as: name, job title, company name, business number, home number, fax number, mobile number, email addresses, web pages, and the like. The contact lists can become very long. For example, some contact lists may include everyone in a large company. Finding contacts within these contact lists can be difficult. Additionally, the mobile devices typically do not contain all of the contacts that are available to the user on his desktop machine. As a result, a user may not be able to find a contact on their mobile device that they need. What is needed is a way to maintain contacts on a device such that the user has access to the contacts that they need.

SUMMARY OF THE INVENTION

The present invention is directed at populating a mobile device with a selected subset of global address list (GAL) contacts. The offline GAL contacts stored on the device are in sync with the master corporate GAL.

According to one aspect of the invention, the GAL contacts are automatically selected based on the user's emails that were sent. The GAL contacts may be selected from the user's sent items folder 'to' line.

According to another aspect, contacts are added based on the organizer and attendees at meetings.

According to another aspect of the invention, the GAL contacts provided to the device are not duplicates of the contacts stored in the user's personal contact list.

According to yet another aspect of the invention, the GAL contacts are browsed and searched seamlessly with the user's other contacts.

DETAILED DESCRIPTION OF THE PREFERRED EMBODIMENT

The present invention is directed towards providing a method and system for providing a mobile device with a selected subset of global address list (GAL) contacts. The selected subset of GAL contacts are automatically selected based on the user's recent emails and/or meetings and are not duplicates of the contacts within the user's personal contact list. The GAL contacts are browsed and searched seamlessly with the user's other contacts.

Illustrative Operating Environment

Figure 1:
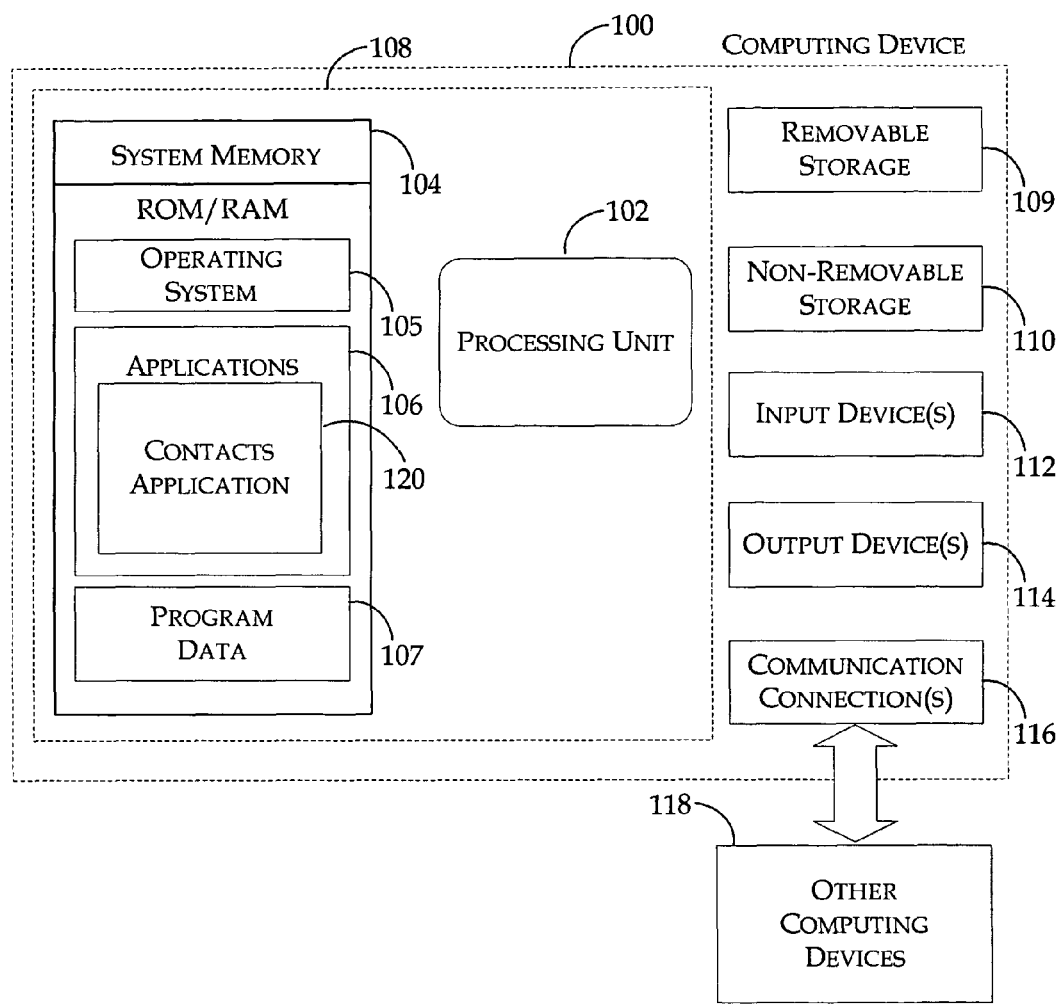
FIGS. 1 and 2 illustrate exemplary computing devices that may be used according to exemplary embodiments of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system, memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include a contacts application 120 that has access to a GAL. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier-wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
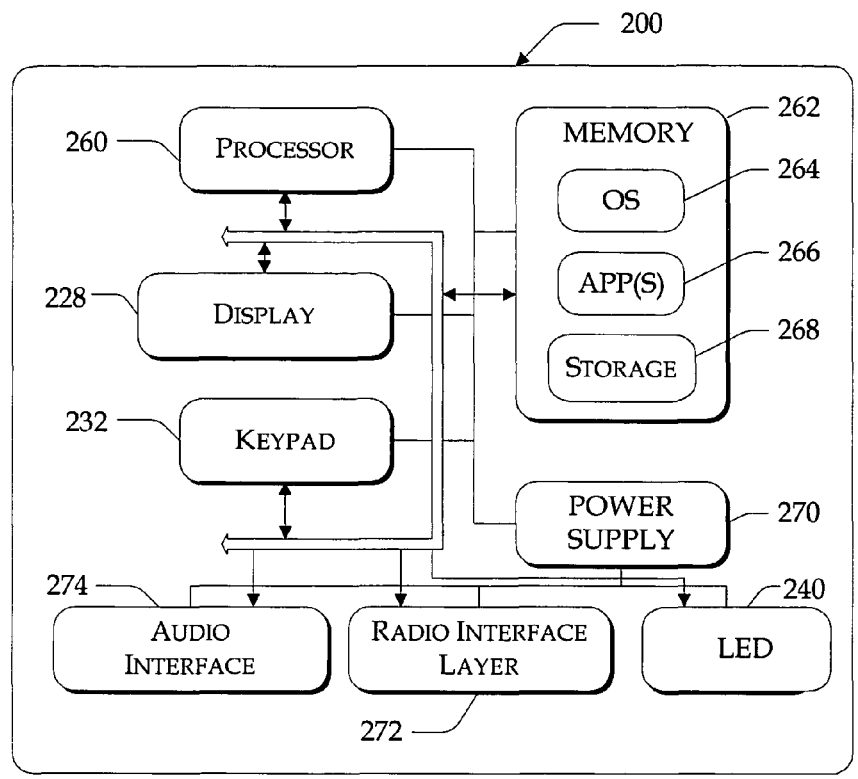

FIG. 2 illustrates a mobile computing device that may be used according to an exemplary embodiment of the present invention. Mobile computing device 200 includes processor 260, memory 262, display 228, and keypad 232. Memory 262 generally includes both volatile memory (e.g., RAM) and non-volatile memory (e.g., ROM, Flash Memory, or the like). Mobile computing device 200 includes operating system 264, such as the Windows CE operating system from Microsoft Corporation, or another operating system, which is resident in memory 262 and executes on processor 260. Keypad 232 may be a push button numeric dialing pad (such as on a typical telephone), a multi-key keyboard (such as a conventional keyboard). Display 228 may be a liquid crystal display, or any other type of display commonly used in mobile computing devices. Display 228 may be touch-sensitive, and would then could also act as an input device.

One or more application programs 266 are loaded into memory 262 and run on the operating system 264. A contacts application resides on mobile computing device 200 and is programmed to provide operations relating to providing contacts, including GAL contacts, to the mobile device. The contacts application may reside in the hardware or software of the device. Mobile computing device 200 also includes non-volatile storage 268 within memory 262. Non-volatile storage 268 may be used to store persistent information which should not be lost if mobile computing device 200 is powered down. For example, storage 268 may store GAL contacts.

Mobile computing device 200 includes power supply 270, which may be implemented as one or more batteries. Power supply 270 might further include an external power source, such as an AC adapter or a powered docking cradle that supplements or recharges the batteries.

Mobile computing device 200 is shown with two types of optional external notification mechanisms: LED 240 and audio interface 274. These devices may be directly coupled to power supply 270 so that when activated, they remain on for a duration dictated by the notification mechanism even though processor 260 and other components might shut down to conserve battery power. Audio interface 274 is used to provide audible signals to and receive audible signals from the user. For example, audio interface 274 may be coupled to a speaker for providing audible output and to a microphone for receiving audible input, such as to facilitate a telephone conversation.

Mobile computing device 200 also includes communications connection, such as wireless interface layer 272, that performs the function of transmitting and receiving wireless communications. The wireless interface layer 272 facilitates wireless connectivity between the mobile computing device 200 and the outside world. According to one embodiment, transmissions to and from the wireless interface layer 272 are conducted under control of the operating system 264. In other words, communications received by wireless interface layer 272 may be disseminated to application programs 266 via operating system 264, and vice versa.

Illustrative GAL System

Figure 3:
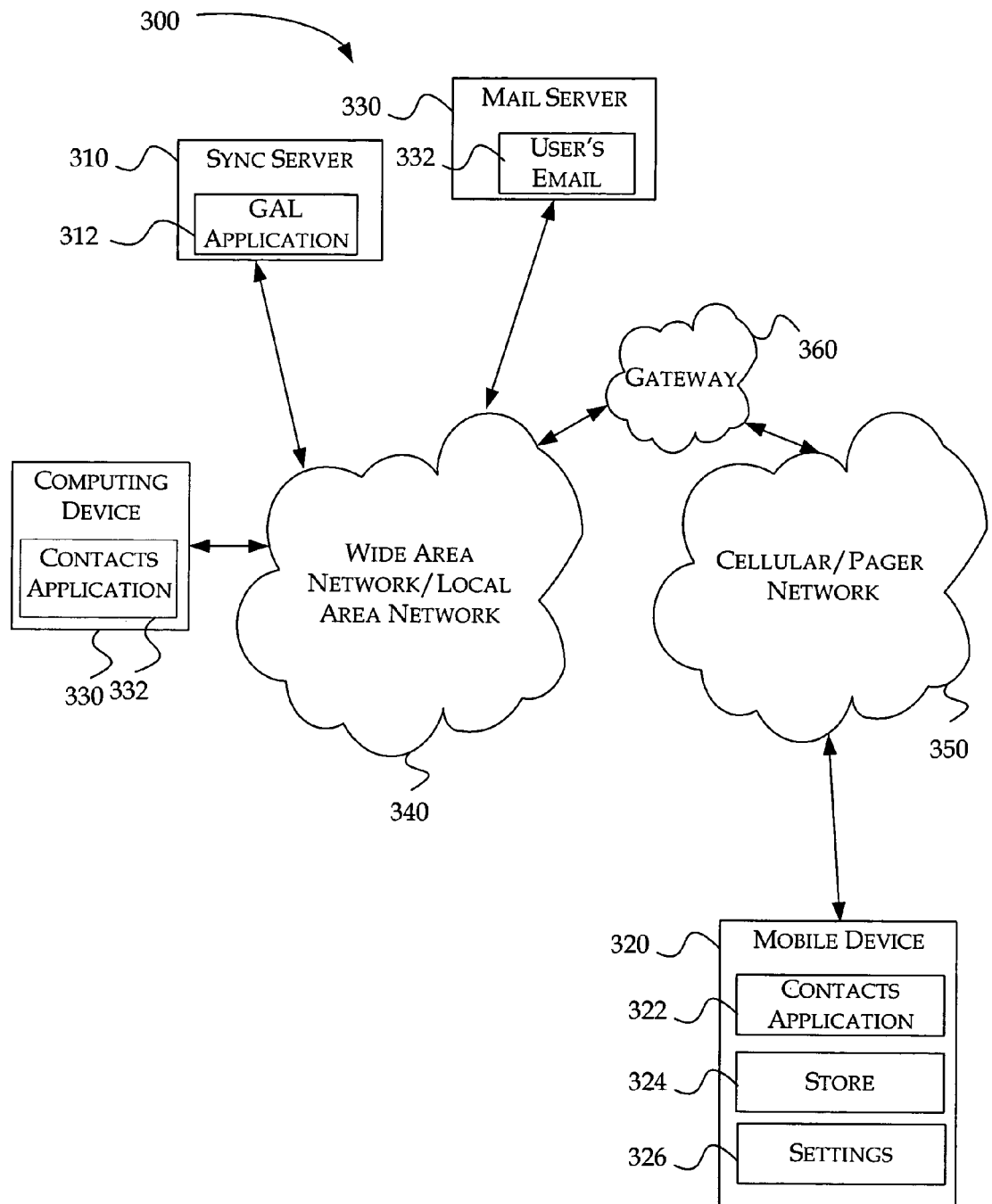
FIG. 3 is a functional block diagram generally illustrating a GAL system for populating GAL contacts on a mobile device.

FIG. 3 is a functional block diagram generally illustrating a GAL system 300 for populating GAL contacts on a mobile device, in accordance with aspects of the invention. Sync Server 310 and computing device 330 are computing devices such as the one described above in conjunction with FIG. 1 and mobile device 320 is a mobile computing device such as the one described above in conjunction with FIG. 2.

Sync Server 310 runs GAL application 312. GAL application 312 is configured to generate a GAL associated with a user and provide the selected GAL contacts to the mobile device. Generally, sync server 310 retrieves meeting attendees, organizers and a selected number of emails from the user's email sent items box (332) on mail server 330 and determines the unique GAL contacts to be added to the GAL list from the address 'to' line of the emails. In other words, the unique GAL contacts are determined from the primary addresses within the user's sent emails. Server 310 compares the GAL contacts to the user's personal contact list to ensure there are no duplicates. Information to include the unique GAL contacts on device 320 are transmitted over a wide area network (WAN)/local area network (LAN) 340 through gateway 360 to network 350 to mobile device 320.

Contacts application 322 residing on mobile device 320 is configured to receive the selected GAL contacts from server 310 and to communicate with the GAL application 312 on sync server 310. The received GAL contacts are stored in store 324 and are accessible by contacts application 322 in the same manner other contacts are accessed.

Cellular/pager network 350 is a network responsible for delivering messages to and receiving messages from wireless devices. The cellular/pager network 350 may include both wireless and wired components.

Gateway 360 provides a means for transporting the message from the WAN/LAN 340 to cellular/pager network 350.

The user of mobile device 320 determines the maximum number of GAL contacts to retrieve and store in the device. According to one embodiment, the user chooses the number of email 'to' line entries to get from the sent items in their email program. This setting is stored in settings 326 on mobile device 320. According to one embodiment, the number of emails to retrieve is a predefined number that may be selected from 25, 50, 100, 200, and 500. The user can also limit by time. The time limit may be selected from 2 days, 1 week, 1 month, 3 months or a year. In addition to retrieving emails, the user's meetings are accessed and the attendees and organizer of the meeting are added to the selected contacts. The user may limit the number of contacts retrieved from meetings to be added. The user may also specify that certain meetings be ignored. For example, a meeting with the entire company may be ignored.

Figure 4:
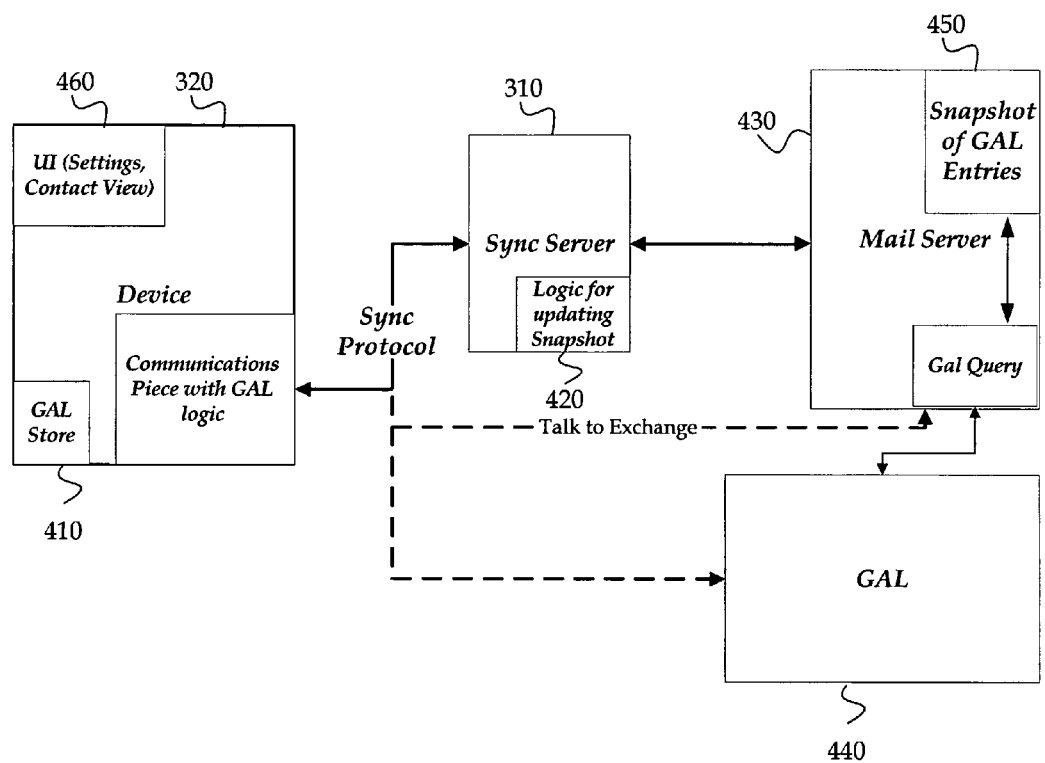
FIG. 4 illustrates a system diagram for a GAL Sync session.

FIG. 4 illustrates a system diagram for a GAL Sync session, in accordance with aspects of the present invention. Device GAL store 410 is configured to store GAL contacts. The number of GAL contacts is limited by a user setting. For example, according to one embodiment, the number of GAL contacts is limited to five hundred.

Logic for updating a user snapshot list 420 is maintained on sync server 320. Sync server 320 retrieves a snapshot of GAL entries (450) from mail server 430. The server snapshot list does not include contacts from the user's personal contacts. This helps to ensure that the GAL contacts for the user are unique contacts that aren't already in the user's contact list.

The size of the server snapshot list is set by an administrator. Saving the GAL list on the server helps to ensure that the GAL list is available even when the user cold boots their device, or clears their sent items folder. According to one embodiment, the server snapshot list is refreshed each time the device requests a GAL Sync.

Upon synchronization, the server pulls data from the user's Sent Items and determines if there are changes from the last sync by comparing the current snapshot and the snapshot held on the device and makes additions and updates to the snapshot. Unique contacts are obtained from the 'to' line in the sent items folder (430). The 'To' line contains people in direct communication with the user. Unique contacts may also be retrieved from other items. For example, unique contacts could be retrieved from the 'cc' line or the 'bcc' line of an email message. Attendees and meeting organizers for all meetings within a predetermined time may also be added to the GAL contact list. It is likely that a user will follow up with attendees from past meetings and need to talk with attendees of future meetings.

The server snapshot list is updated from properties obtained from the master GAL (440). The GAL contacts to be sent to the device are selected by the server based on a set of sync rules on the server.

Only the updates to the GAL are sent to the device GAL store (410) in order to avoid syncing the same contacts. Server 310 determines what contacts have been added to or deleted from the GAL contact list and only syncs the changes with device 320.

As discussed above, mail server 430 maintains a user snapshot list of GAL entries. The user snapshot includes a number of different contacts. According to one embodiment, the snapshot includes the most recently emailed contacts by number of contacts (e.g. last 50 people); the most recently emailed contacts by date/time (e.g. the last 24 hours); the contacts that have emailed the user most recently by frequency of contacts (where the user is the only name on the To: line); and the attendees and organizer to meeting requests from calendar items. The snapshot may include more or less items. For example, the GAL list could look at phone calls, SMS messages, IM messages, and the like. The snapshot may be stored at other locations. For example, the snapshot may be stored on sync server 310.

The UI settings (460) contain settings that affect the GAL contacts stored on the device. The settings include limits on the number of contacts as well as when to sync the GAL list and how to view the contacts. For example, the GAL data may be synchronized every sync session, once a day, or on demand.

The following examples will be used to further illustrate the GAL system. Suppose that Ray needs to find contact information for Kate D. When Ray set the device sync settings he selected to sync a predetermined number of his most contacted co-workers that are not maintained in his personal contact list. After Ray syncs his device with the server, his device will contain GAL contacts for people that he sent email to recently or attended a meeting with. Supposing that Ray is now away from his office and he now needs access to Kate's phone number and office number he navigates his contacts and searches for Kate D. The Contacts list shows all of the Kate D's stored in his contact list and Ray clicks on the correct Kate D. and the device displays Kate's contact info. By default, the offline GAL contacts are shown in the all contacts view. The user can change to view only the offline GAL by changing the contacts filter to display the desired category of contacts. GAL contacts and personal contacts are treated the same, except for deletes. The user can perform the same actions on an offline contact as they can a regular contact. This includes editing, deleting, beaming, calling, and emailing. The user can edit an offline Contact and add information to the contact card.

Now suppose that Ray desires to keep Steve's contact synced to the GAL. To achieve this, Ray browses his corporate address book on his device and finds Steve's contact information. When he clicks on Steve's name to display his information, the device automatically places Steve's contact in Ray's Offline GAL store. Ray now wants to keep Steve's data in sync with the Corporate master GAL. He taps and holds on Steve's contact name and chooses the sync option. The next time and any subsequent times that Ray syncs the GAL with sync server, Steve's corporate contact information will always be kept up to date.

Figure 5:
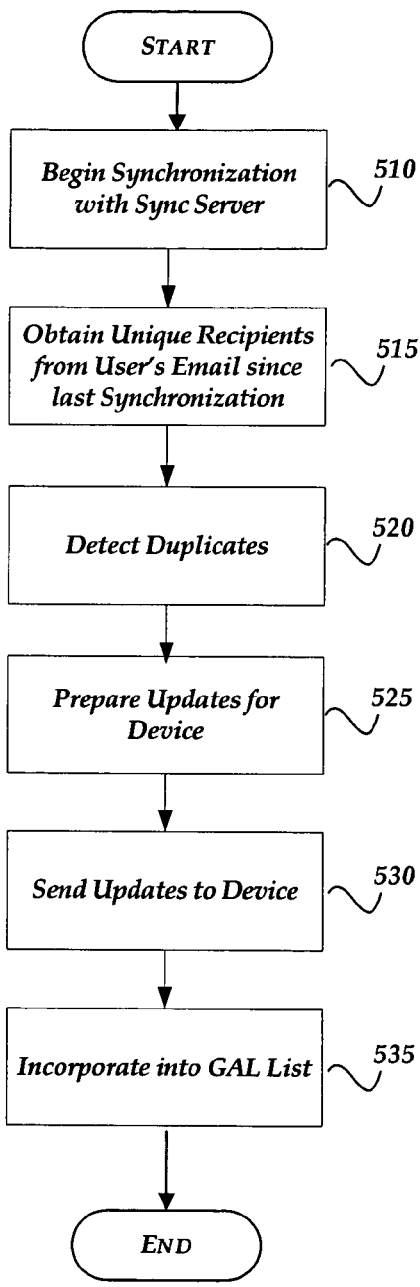
FIG. 5 illustrates a synchronization flow.

FIG. 5 illustrates a synchronization flow, in accordance with aspects of the invention. After a start block, the process flows to block 510 where the synchronization session begins.

Upon connecting to the server, the process moves to block 515 where the unique contacts are obtained from the user's email since the time of the last synchronization. According to one embodiment, the 'to' line of the sent items for the user is searched. Other items may be searched as well, including, but not limited too meeting organizers and attendees, as well as contacts within the 'cc' line or 'bcc' line.

Transitioning to block 520, the server checks for duplicate contacts. According to one embodiment, the email address is used as a unique identifier. The fields in the user's contact list are updated and only the user's updated contact list entry instead of the offline GAL entry is synchronized.

Moving to block 525, the updates for the GAL list for the user's device are prepared. Instead of sending the entire GAL list each time a synchronization occurs, only updates to the user's GAL list are sent to the device.

At block 530, the updates are sent to the device. Next, at block 535, the device incorporates the received updates into its GAL list. The process then moves to an end block and returns to processing other actions.

Figure 6:
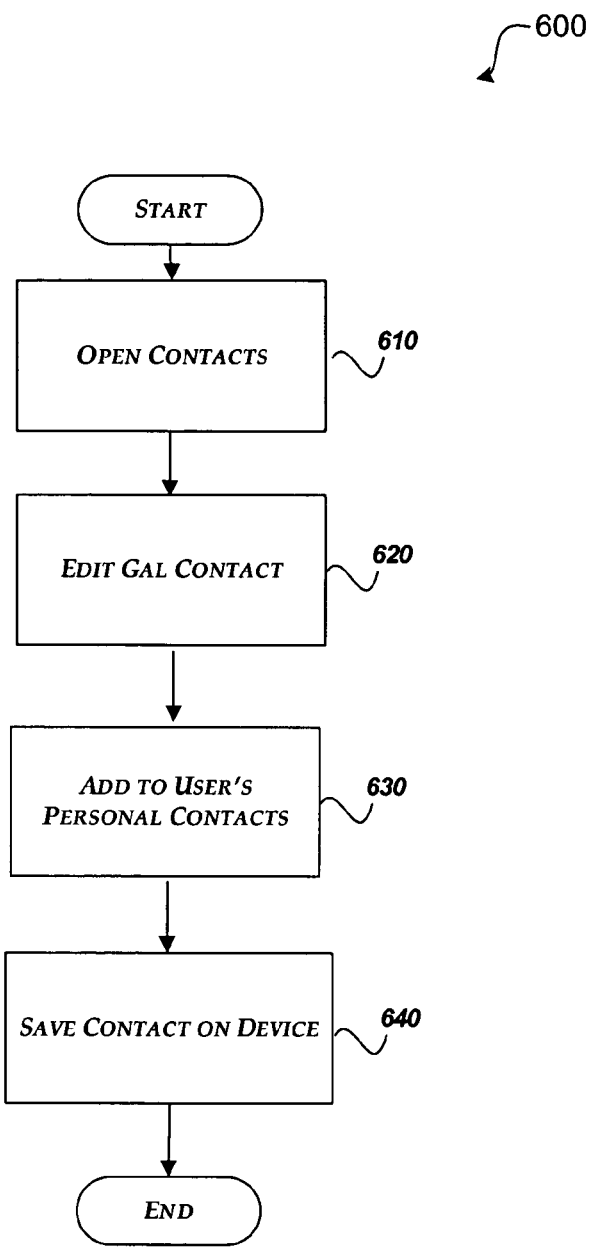
FIG. 6 shows a process flow for editing a GAL contact on a device.

FIG. 6 shows a process flow for editing a GAL contact on a device, in accordance with aspects of the present invention. According to one embodiment, GAL contacts on the device are shown in the default view of the user's contacts along with every other contact. The GAL contacts are visually distinguishable from the user's personal contacts when the contact's summary card is opened.

Figure 7:
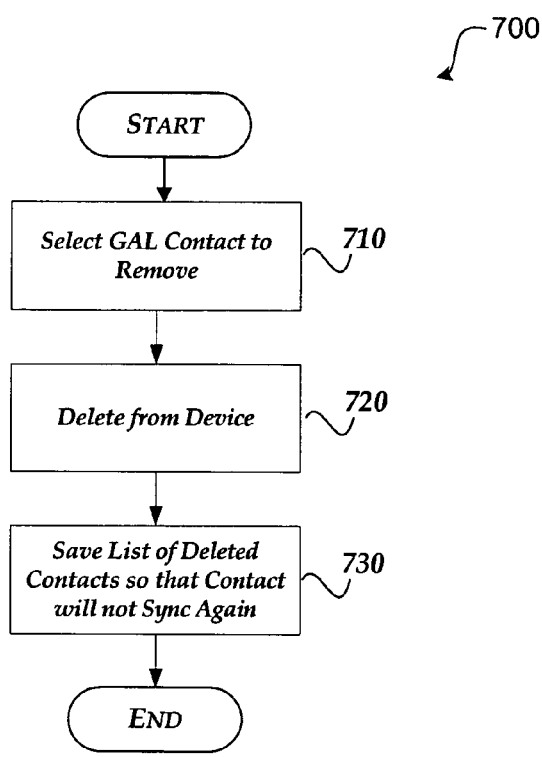
FIG. 7 illustrates a process flow for removing a GAL contact on a device, in accordance with aspects of the invention.

After a start block, the process flows to block 610 where the GAL contact is opened on the device. Moving to block 620, the user edits the GAL contact. Upon selecting to edit GAL contact, the process flows to block 630 where the GAL contact is added to the user's personal contact list. The contact does not need to be removed from the GAL list since the server will recognize the contact as a duplicate and remove it from the GAL list during the next synchronization. After saving the contact at step 640, the contact will now be synced as a personal contact. The process then moves to an end block and returns to processing other actions. FIG. 7 illustrates a process flow for removing a GAL contact on a device, in accordance with aspects of the invention. After a start block, the process flows to block 710, where the GAL contact to remove is selected. Moving to block 720, the contact is removed from the device. According to one embodiment, when a user deletes an offline GAL entry it is never synchronized with the device again. Moving to block 730, the deleted contact is added to a list of deleted offline entries so that the contact is not synced again until the contact is removed from the list. According to one embodiment, the list of deleted contacts is stored on the sever and checked each time before syncing up a contact with the device. The process then moves to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for populating a list of GAL contacts on a device, comprising:

automatically selecting and creating global address list (GAL) contacts on a server for a user to include on the device in addition to a user's personal contacts that are already stored on the device, wherein automatically selecting GAL contacts comprises automatically obtaining the GAL contacts from: the user's meeting requests; the user's phone calls; the user's SMS messages; and the user's IM messages;

on the server, removing any duplicates from the GAL contacts to ensure that the GAL contacts are unique from the user's personal contacts;

preparing the GAL contacts to provide to the device including limiting a number of GAL contacts to be provided to the device; and providing from the server the GAL contacts to the device; wherein the GAL contacts are automatically incorporated with the user's personal contacts and wherein a display of the GAL contacts are visually distinguishable from the user's personal contacts when displayed together within a contact view on the device and visually distinguishable from the user's personal contacts when a summary card for one of the GAL contacts is opened; wherein the user's personal contacts are treated differently from the provided GAL contacts such that the user's personal contacts are maintained during a synchronization that updates the provided GAL contacts; wherein upon selection of a provided GAL contact to edit, the provided GAL contact is added to the user's personal contacts such that the provided GAL contact that was edited becomes one of the user's personal contacts during a next synchronization and is synchronized as a personal contact rather than a GAL contact.

2. The method of claim 1, wherein automatically selecting the global GAL contacts, further comprises obtaining the GAL contacts from a user's emails, including obtaining a primary addressee from each of a predetermined number of sent emails from the user.

3. The method of claim 1, wherein automatically selecting the global GAL contacts, further comprises obtaining the GAL contacts from meeting requests.

4. The method of claim 1, further comprising determining when one of the GAL contacts on the device is removed by the user; and when one of the GAL contacts on the device is removed by the user preventing the removed GAL contact from being provided to the device during a subsequent synchronization after being automatically selected.

5. The method of claim 2, further comprising limiting the number of GAL contacts provided to the device.

6. The method of claim 2, further comprising maintaining a user snapshot list outside of the device that is related to the GAL contacts for the user; wherein the user snapshot excludes the user's personal contacts.

7. The method of claim 2, wherein the GAL contacts are obtained from a GAL store on a server.

8. A system for populating a list of GAL contacts on a device, comprising:
a device including a communications connection, a data store, a display, and a processor that performs the following actions, including:
connecting to a network using the communications connection to perform a synchronization;
receiving an update list from the network containing information to update global address list (GAL) contacts that are unique from a user's personal contacts and are in addition to the user's personal contacts; wherein the GAL contacts are synchronized differently from the user's personal contacts; and wherein the GAL contacts are visually distinguishable within a contact view from the user's personal contacts when a summary card for a contact is opened;
updating the GAL contacts;
storing the updated GAL contacts in the data store;
displaying the GAL contacts on the display; and upon selection of one of the GAL contacts to edit adding the edited GAL contact as a personal contact to the user's personal contacts on the device such that the edited GAL contact is one of the user's personal contacts during a next synchronization;
a server including a communications connection, a data store, and a processor that is performs the following actions, including:
obtaining the global address list (GAL) contacts for the user; wherein obtaining the GAL contacts comprises obtaining the GAL contacts from at least one of: the user's meeting requests; the user's phone calls; the user's SMS messages; and the user's IM messages;
preparing an update list based on the GAL contacts in the data store on the device and the obtained GAL contacts; and
providing the GAL contacts to a device over the network.

9. The system of claim 8, wherein obtaining the global address list (GAL) contacts for the user, further comprises obtaining the GAL contacts from a user's emails.

10. The system of claim 9, wherein obtaining the GAL contacts from the user's emails, further comprises obtaining a primary addressee from each of a predetermined number of sent emails from the user.

11. The system of claim 10, further comprising obtaining the GAL contacts from meeting requests.

12. The system of claim 9, wherein obtaining the GAL contacts from the user's emails further comprises accessing a mail server and retrieving a predetermined number of emails from a user's sent emails.

13. The system of claim 10, further comprising displaying the GAL contacts along with the user's personal contacts on the display.

14. A computer-readable storage medium, that is not a signal, including computer-executable instructions for populating a list of GAL contacts, comprising:
beginning a synchronization session;
automatically selecting global address list (GAL) contacts for a user that are in addition to a user's personal contacts on the device and that are unique from the user's personal contacts from the user's emails, wherein automatically selecting GAL contacts comprises obtaining the GAL contacts from at least two of: meeting requests; phone calls; SMS messages; and IM messages; wherein the GAL contacts on the device are synchronized differently from the user's personal contacts on the device such that when a GAL contact is deleted on the device, a record is maintained indicating to remove the GAL contact from the automatically selected GAL contacts before providing the GAL contacts to the device during a subsequent synchronization; and wherein the GAL contacts are visually distinguishable within a contact view on the device from the user's personal contacts; wherein upon selection of a GAL contact on the device to edit, the GAL contact is added to the user's personal contacts such that the GAL contact becomes one of the user's personal contacts during a next synchronization and is synchronized as a personal contact rather than a GAL contact; and
providing the GAL contacts to the device.

15. The computer-readable storage medium of claim 14, wherein obtaining the GAL contacts from the user's emails, further comprises obtaining a primary addressee from each of a predetermined number of sent emails from the user.

16. The computer-readable storage medium of claim 14, wherein automatically selecting the global GAL contacts, further comprises obtaining the GAL contacts from meeting requests.

17. The computer-readable storage medium of claim 14, wherein providing the GAL contacts to the device, further comprises providing updates to the device in order to update a GAL contact store on the device.

18. The computer-readable storage medium of claim 15, further comprising maintaining a user snapshot list outside of the device that is related to the GAL contacts for the user.

* * * * *